(12) United States Patent
Chen-Ho et al.

(10) Patent No.: US 10,017,001 B2
(45) Date of Patent: Jul. 10, 2018

(54) LASER-PERSONALIZABLE SECURITY ARTICLES

(75) Inventors: Kui Chen-Ho, Woodbury, MN (US); Christopher K. Haas, St. Paul, MN (US); Douglas S. Dunn, Maplewood, MN (US); Steven Hin-Chung Kong, Woodbury, MN (US); David B. Olson, Marine on St. Croix, MN (US); Randy A. Larson, River Falls, WI (US); Travis L. Potts, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 680 days.

(21) Appl. No.: 14/118,688

(22) PCT Filed: May 16, 2012

(86) PCT No.: PCT/US2012/038110
§ 371 (c)(1),
(2), (4) Date: Feb. 17, 2014

(87) PCT Pub. No.: WO2012/162057
PCT Pub. Date: Nov. 29, 2012

(65) Prior Publication Data
US 2014/0197625 A1 Jul. 17, 2014

Related U.S. Application Data

(60) Provisional application No. 61/488,206, filed on May 20, 2011.

(51) Int. Cl.
*B42D 25/00* (2014.01)
*B42D 25/435* (2014.01)
(Continued)

(52) U.S. Cl.
CPC ............. *B42D 25/41* (2014.10); *B42D 25/00* (2014.10); *B42D 25/21* (2014.10); *B42D 25/23* (2014.10);
(Continued)

(58) Field of Classification Search
CPC .................................... B42D 25/435
See application file for complete search history.

(56) References Cited

U.S. PATENT DOCUMENTS

RE24,906 E    12/1960   Ulrich
3,154,872 A    11/1964   Nordgren
(Continued)

FOREIGN PATENT DOCUMENTS

DE      4441198      5/1996
EP      0372756      6/1990
(Continued)

OTHER PUBLICATIONS

Smith, "The Design of Optical systems", Modern Optical Engineering; pp. 104-105 (1966).
(Continued)

*Primary Examiner* — Kyle Grabowski
(74) *Attorney, Agent, or Firm* — Jeffrey M. Olofson

(57) ABSTRACT

Laser-personalizable security articles include multi-layer security documents. The multi-layer security document includes an optically transparent cover layer, a composite image and an imagable layer adjacent to the cover layer. The first surface of the cover layer is at least partially a microstructured surface, where the microstructured surface forms microlenses or a lenticular surface. The composite image is made by a collection of complete or partial images viewed through the microstructured surface of the cover layer. The composite image is located on or within the second surface of the cover layer. The imagable layer is a laser imagable (Continued)

layer. When imaged, a personalized second composite three dimensional image is created on or in the imagable layer.

20 Claims, 4 Drawing Sheets

(51) Int. Cl.
| | |
|---|---|
| *B42D 25/41* | (2014.01) |
| *B42D 25/20* | (2014.01) |
| *B42D 25/21* | (2014.01) |
| *B42D 25/23* | (2014.01) |
| *B42D 25/24* | (2014.01) |
| *G02B 3/00* | (2006.01) |
| *B42D 25/29* | (2014.01) |
| *B42D 25/455* | (2014.01) |
| *B42D 25/46* | (2014.01) |
| *B42D 25/324* | (2014.01) |

(52) U.S. Cl.
CPC ........... *B42D 25/24* (2014.10); *B42D 25/285* (2014.10); *B42D 25/29* (2014.10); *B42D 25/435* (2014.10); *B42D 25/455* (2014.10); *B42D 25/46* (2014.10); *G02B 3/0056* (2013.01); *B42D 25/324* (2014.10); *B42D 2033/30* (2013.01); *B42D 2035/34* (2013.01); *B42D 2035/50* (2013.01); *Y10T 156/10* (2015.01)

(56) References Cited

U.S. PATENT DOCUMENTS

| | | | |
|---|---|---|---|
| 3,250,808 A | 5/1966 | Moore | |
| 3,801,183 A | 4/1974 | Sevelin | |
| 4,082,426 A | 4/1978 | Brown | |
| 4,099,838 A | 7/1978 | Cook | |
| 4,121,011 A | 10/1978 | Glover | |
| 4,200,875 A | 4/1980 | Galanos | |
| 4,424,990 A | 1/1984 | White | |
| 4,619,979 A | 10/1986 | Kotnour | |
| 4,654,233 A | 3/1987 | Grant | |
| 4,728,571 A | 3/1988 | Clemens | |
| 4,743,526 A | 5/1988 | Ando | |
| 4,765,656 A * | 8/1988 | Becker | B42D 25/00 283/70 |
| 4,833,179 A | 5/1989 | Young | |
| 4,843,134 A | 6/1989 | Kotnour | |
| 4,855,184 A | 8/1989 | Klun | |
| 5,591,527 A | 1/1997 | Lu | |
| 5,637,646 A | 6/1997 | Ellis | |
| 5,648,407 A | 7/1997 | Goetz | |
| 5,677,050 A | 10/1997 | Bilkadi | |
| 5,712,731 A | 1/1998 | Drinkwater | |
| 5,838,466 A | 11/1998 | Mallik | |
| 5,877,895 A | 3/1999 | Shaw | |
| 5,944,356 A * | 8/1999 | Bergmann | B42D 25/41 283/109 |
| 6,010,751 A | 1/2000 | Shaw | |
| 6,224,949 B1 | 5/2001 | Wright | |
| 6,264,747 B1 | 7/2001 | Shaw | |
| 6,288,842 B1 | 9/2001 | Florczak | |
| 6,299,799 B1 | 10/2001 | Craig | |
| 6,339,111 B1 | 1/2002 | Moon | |
| 6,376,590 B2 | 4/2002 | Kolb | |
| 6,749,925 B2 | 6/2004 | Hoppe | |
| 6,758,936 B1 | 7/2004 | Kiekhaefer | |
| 7,241,437 B2 | 7/2007 | Davidson | |
| 7,336,422 B2 | 2/2008 | Dunn | |
| 7,385,020 B2 | 6/2008 | Anderson | |
| 7,449,146 B2 | 11/2008 | Rakow | |
| 7,728,048 B2 * | 6/2010 | Labrec | B41M 5/24 252/501.1 |
| 2003/0183695 A1 * | 10/2003 | Labrec | B42D 25/00 235/487 |
| 2004/0077775 A1 | 4/2004 | Audenaert | |
| 2005/0109850 A1 * | 5/2005 | Jones | B42D 25/00 235/487 |
| 2005/0250921 A1 | 11/2005 | Qiu | |
| 2007/0081254 A1 | 4/2007 | Endle | |
| 2007/0178295 A1 | 8/2007 | Haas | |
| 2008/0118862 A1 | 5/2008 | Dunn | |
| 2008/0160185 A1 | 7/2008 | Endle | |
| 2008/0212192 A1 | 9/2008 | Steenblik | |
| 2008/0284157 A1 * | 11/2008 | Muke | B42D 25/00 283/86 |
| 2009/0003517 A1 | 1/2009 | Yoneyama | |
| 2009/0035179 A1 | 2/2009 | Rakow | |
| 2009/0310470 A1 * | 12/2009 | Yrjonen | B42D 25/00 369/116 |
| 2010/0103528 A1 * | 4/2010 | Endle | B42D 25/435 359/620 |
| 2011/0063392 A1 | 3/2011 | Wu | |
| 2011/0086221 A1 | 4/2011 | Pokorny | |

FOREIGN PATENT DOCUMENTS

| | | | |
|---|---|---|---|
| EP | 1077426 | 2/2001 | |
| JP | 07-090028 | 4/1995 | |
| WO | WO 1997-33945 | 9/1997 | |
| WO | WO 2003-061983 | 7/2003 | |
| WO | WO 2006-102383 | 9/2006 | |
| WO | WO 2006-137738 | 12/2006 | |
| WO | WO 2007-047259 | 4/2007 | |
| WO | WO 2009-140088 | 11/2009 | |
| WO | WO 2010-075373 | 7/2010 | |
| WO | WO 2010-115235 | 10/2010 | |
| WO | WO 2010115235 A1 * | 10/2010 | ............ B42D 25/43 |
| WO | WO 2012-003247 | 1/2012 | |
| WO | WO 2012-012118 | 1/2012 | |
| WO | WO 2012-162041 | 11/2012 | |
| WO | WO 2012-162053 | 11/2012 | |
| WO | WO 2012-162057 | 11/2012 | |

OTHER PUBLICATIONS

International Search Report for PCT International Application No. PCT/US2012/038026, dated Jan. 3, 2013, 7 pages.

* cited by examiner

LASER-PERSONALIZABLE SECURITY ARTICLES

FIELD OF THE DISCLOSURE

The present disclosure relates generally to the field of security articles and methods of preparing security articles. Specifically, this disclosure relates to security articles that contain a security feature that is a composite image, and that can have laser-personalized security information added to the article.

BACKGROUND

Security articles have been prepared that include multiple layers of sheeting materials. Sheeting materials having a graphic image or other mark have been widely used, particularly as security labels or laminates for authenticating an article or document. For example, sheetings such as those described in U.S. Pat. Nos. 3,154,872; 3,801,183; 4,082,426; and 4,099,838 have been used as validation stickers for vehicle license plates, and as security films for driver's licenses, government documents, tape cassettes, playing cards, beverage containers, and the like. Other uses include graphics applications for identification purposes such as on police, fire or other emergency vehicles, in advertising and promotional displays and as distinctive labels to provide brand enhancement.

Another form of imaged sheeting is disclosed in U.S. Pat. No. 4,200,875 (Galanos). Galanos discloses the use of a particularly "high-gain retroreflective sheeting of the exposed-lens type," in which images are formed by laser irradiation of the sheeting through a mask or pattern. That sheeting comprises a plurality of transparent glass microspheres partially embedded in a binder layer and partially exposed above the binder layer, with a metal reflective layer coated on the embedded surface of each of the plurality of microspheres. The binder layer contains carbon black, which is said to minimize any stray light that impinges on the sheeting while it is being imaged. The energy of the laser beam is further concentrated by the focusing effect of the microlenses embedded in the binder layer.

The images formed in the retroreflective sheeting of Galanos can be viewed if, and only if, the sheeting is viewed from the same angle at which the laser irradiation was directed at the sheeting. That means, in different terms, that the image is only viewable over a very limited observation angle. For that and other reasons, there has been a desire to improve certain properties of such a sheeting.

As early as 1908, Gabriel Lippmann invented a method for producing a true three-dimensional image of a scene in lenticular media having one or more photosensitive layers. That process, known as integral photography, is also described in De Montebello, "Processing and Display of Three-Dimensional Data II" in Proceedings of SPIE, San Diego, 1984. In Lippmann's method, a photographic plate is exposed through an array of lenses (or "lenslets"), so that each lenslet of the array transmits a miniature image of the scene being reproduced, as seen from the perspective of the point of the sheet occupied by that lenslet, to the photosensitive layers on a photographic plate. After the photographic plate has been developed, an observer looking at the composite image on the plate through the lenslet array sees a three-dimensional representation of the scene photographed. The image may be in black and white or in color, depending on the photosensitive materials used.

Because the image formed by the lenslets during exposure of the plate has undergone only a single inversion of each miniature image, the three-dimensional representation produced is pseudoscopic. That is, the perceived depth of the image is inverted so that the object appears "inside out." This is a major disadvantage, because to correct the image it is necessary to achieve a second optical inversion. These methods are complex, involving multiple exposures with a single camera, or multiple cameras, or multi-lens cameras, to record a plurality of views of the same object, and require extremely accurate registration of multiple images to provide a single three-dimensional image. Further, any method that relies on a conventional camera requires the presence of a real object before the camera. This further renders that method ill-adapted for producing three-dimensional images of a virtual object (meaning an object that exists in effect, but not in fact). A further disadvantage of integral photography is that the composite image must be illuminated from the viewing side to form a real image that may be viewed.

Another form of imaged sheeting is disclosed in U.S. Pat. No. 6,288,842 (Florczak et al.). Florczak et al. discloses microlens sheeting with composite images, in which the composite image floats above or below the sheeting, or both. The composite image may be two-dimensional or three-dimensional. Methods for providing such sheeting, including by the application of radiation to a radiation sensitive material layer adjacent the microlenses, are also disclosed. This patent discloses that images are created as a result of a compositional change, a removal or ablation of the material, a phase change, or a polymerization of the coating disposed adjacent to one side of the microlens layer or layers.

US Patent Publication No. 2007/0081254 (Endle et al.) also discloses microlens sheeting with composite images, in which the composite image floats above or below the sheeting, or both. The composite image may be two-dimensional or three-dimensional. Methods for providing such sheeting are also disclosed.

U.S. Pat. No. 5,712,731, "Security Device for Security Documents Such as Bank Notes and Credit Cards," (Drinkwater et al.) discloses a security device that includes an array of microimages which, when viewed through a corresponding array of substantially spherical microlenses, generates a magnified image. In some cases, the array of microlenses is bonded to the array of microimages.

PCT Patent Application Publication, WO 03/061983 A1, "Micro-Optics For Article Identification" discloses methods and compositions for identification and counterfeit deterrence using non-holographic micro-optics and microstructures having a surface relief greater than a few microns.

SUMMARY

Disclosed herein are laser-personalizable security articles, laser-personalized security articles and methods of preparing laser-personalizable security articles. In some embodiments the laser-personalizable security article comprises a multi-layer security document. The multi-layer security document comprises an optically transparent cover layer, a composite image and an imagable layer adjacent to the cover layer. The optically transparent cover layer comprises a first surface, a second surface, and a thickness between the first surface and the second surface. The first surface of the cover layer is at least partially a microstructured surface, where the microstructured surface forms microlenses or a lenticular surface. The composite image comprises a collection of complete or partial images located such that when viewed through the microstructured surface of the cover layer, the collection of complete or partial images forms the composite image. The composite image is located on or within the second surface of the cover layer. The imagable layer comprises a laser imagable layer.

Also disclosed are laser-personalized multi-layer security articles that comprise the laser-personalizable security articles described above that have been laser imaged to generate a second personalized three dimensional composite image. These articles comprise an optically transparent cover layer, a first composite image and an imaged layer adjacent to the cover layer. There are no adhesive layers between the cover layer and the imaged layer. The optically transparent cover layer comprises a first surface, a second surface, and a thickness between the first surface and the second surface. The first surface of the cover layer is at least partially a microstructured surface, where the microstructured surface forms microlenses or a lenticular surface. The first composite image comprises a collection of complete or partial images located such that when viewed through the microstructured surface of the cover layer, the collection of complete or partial images forms the first composite image. The second personalized composite image is located in the imagable layer adjacent to the cover layer.

Also disclosed are methods of preparing laser-personalizable security articles comprising, providing an optically transparent cover layer sheet with a first surface, a second surface, and a thickness between the first surface and the second surface, providing a composite image, providing an imagable layer sheet, and forming a laminate by laminating the second surface of the cover layer sheet to the imagable layer sheet. The first surface of the cover layer is at least partially a microstructured surface, where the microstructured surface forms microlenses or a lenticular surface. The composite image comprises a collection of complete or partial images located such that when viewed through the microstructured surface of the cover layer, the collection of complete or partial images forms the composite image. The imagable layer comprises a laser imagable layer. In some embodiments, laminating the second surface of the cover layer to the imagable layer sheet comprises lamination by the application of heat and pressure.

BRIEF DESCRIPTION OF THE DRAWINGS

The present application may be more completely understood in consideration of the following detailed description of various embodiments of the disclosure in connection with the accompanying drawings.

Figure 1:
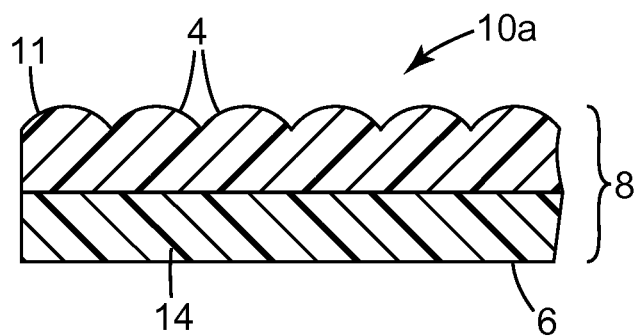
FIG. 1 is an enlarged cross sectional view of a microlens sheeting comprising a plano-convex base sheet.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Security articles are becoming increasingly important. Examples of security articles include identification documents (ID documents) and security documents. The term "ID documents" is broadly defined and is intended to include, but not be limited to, for example, passports, driver's licenses, national ID cards, social security cards, voter registration and/or identification cards, birth certificates, police ID cards, border crossing cards, security clearance badges, security cards, visas, immigration documentation and cards, gun permits, membership cards, phone cards, stored value cards, employee badges, debit cards, credit cards, and gift certificates and cards. ID documents are also sometimes referred to as "security documents". The articles of this disclosure may be the ID document or may be part of the ID document. Other articles may be described as security documents, and typically contain color images and include items of value, such as, for example, currency, bank notes, checks, and stock certificates, where authenticity of the item is important to protect against counterfeiting or fraud, as well as articles which can be used to produce informative, decorative, or recognizable marks or indicia on product tags, product packaging, labels, charts, maps and the like.

Some of the desirable features for security articles are ready authentication and resistance to tampering. Ready authentication can be achieved through the use of indicia that is readily apparent and checked and yet is difficult to copy or falsify. Examples of such indicia include, for example three dimensional floating images in sheeting where the image appears to be above, below, or in the plane of the sheeting. Such images are difficult to counterfeit because the image is not readily reproduced by straightforward methods such as photocopying or photography. Examples of such images include, for example, three dimensional floating images present in some state driver's licenses where a series of three dimensional floating images representing the state name or other logo are present across the license card to verify that the card is an official license and not a counterfeit. Such three dimensional floating images are readily seen and verified.

Resistance to tampering can also be achieved in a variety of ways including permanently bonding or laminating elements of the security article such that they cannot be taken apart without noticeable evidence of tampering. Among the techniques useful to achieve this bonding or lamination include the use of curable adhesives that form a permanent bond and the use of the combined forces of heat and pressure to laminate together layers in such a way that delamination would destroy the article.

Many security articles have multiple levels of security. For example, they may have a three dimensional floating image to verify that the article is authentic in addition to at least one personalized three dimensional composite image that contains personal information such as a photograph, signature or other personal information. In this way, the presence of the three dimensional floating image provides validation to the authenticity of the personal information. For example, many driver's licenses contain a three dimensional floating image to verify that it is an authentic state issued license, as well as three dimensional image(s) of personal information such as a photograph, signature, name, address, etc of the person to whom the license is issued. The three dimensional floating image makes it difficult to copy or alter the license. The permanent bonding of the layers of the card makes it difficult to disassemble and alter the personal information.

However, having multiple levels of security adds to the complexity of forming the security articles. Because the three dimensional floating image and three dimensional composite image of personalized information are present within internal layers of the article, there are generally two ways of preparing the security article. One method is to prepare the layers containing the three dimensional floating image and the three dimensional composite image of personalized information and laminate them together to form the security article. There are a number of drawbacks to this process. This process requires specialized equipment such as adhesive coaters and laminators or equipment to apply heat and pressure to layers to form the lamination such as a heated platen press. These types of equipment work well with large sheet materials but are not very efficient for preparing individual security articles. Also, it is not desirable to have these types of industrial equipment in the places where the personalized information is typically gathered, such as for example, a courthouse or other government office location. Therefore, the personalized information would have to be sent to an industrial location, the personalized information transferred and/or imaged to the proper layer or layers to form the composite images and the security document generated. This can be a very time consuming and labor intensive process and requires that the personalized information, which may be, and often is, sensitive information, leaves the hands of the person collecting the information and be placed at risk of copying or errors in transferring. It is often more desirable for the security article to be generated at the same location where the information is gathered.

In order for the security article to be generated at the same location where the information is gathered, a second method of generating a security article is desirable. In this method, a preformed article is prepared and the desired personal information and security features are written onto the preformed article. In this method, "blank" cards are generated as multi-layer articles that have the three dimensional floating image but no personalized information. These blank cards can be prepared as large sheets using the industrial processes described above and die cut to the desired size. The three dimensional composite image of personalized information can be then written onto the security article with, for example, a laser. The use of lasers to write personalized information onto a security article is a process suitable for individual security articles in a government office setting, unlike the lamination or platen press operations described above.

An added difficulty of generating personalized articles with multiple layers of security is the method by which the three dimensional floating image is generated. In some embodiments it may be desirable to have, in addition to the three dimensional floating image and the three dimensional composite image of personalized information, additional personalized information which is not a three dimensional composite image. This information would appear as a two dimensional image. Typically the surface of the security article has a microstructured surface that forms microlenses or a lenticular surface. The microlenses or lenticular surface makes the image appear three dimensional and gives it the appearance of floating. These types of images and microlenses are described, for example, in U.S. Pat. No. 6,288,842 (Florczak et al.) and US Patent Publication No. 2007/0081254 (Endle et al.). This microstructured surface can also interact with the laser beam that is used to write two dimensional personalized information onto the security article. This difficulty can be overcome by having the microstructured surface only on the part of the surface of the security article where the three dimensional floating image and/or three dimensional composite image of personalized information are located and have the rest of the surface be non-microstructured to permit writing with a laser.

There are a variety of reasons why it is not desirable and can be impractical to have only the portion of the surface of the security article where a three dimensional floating image and/or three dimensional composite image of personalized information are located have a microstructured surface. It can make processing of the large scale sheets from which the security articles are produced more difficult by requiring, for example, exact alignment of the images with the microstructured surface. Also, in many instances it may be desirable to have more than a single three dimensional floating image, such as a series of such images across the entire article in addition to the three dimensional composite image of personalized information. Additionally, the It may also be desired that the three dimensional floating image and the two dimensional personalized information overlap or be near each other. Additionally, the ability of the microstructured surface to frustrate laser writing is itself a security feature, blocking laser tampering of formed cards. Therefore, additional techniques are utilized to permit laser writing of two dimensional personalized information in addition to the laser writing of three dimensional composite image of personalized information. These additional techniques utilize the addition of an optically transparent, removable, conformable layer to the microstructured surface such that the optically transparent, removable, conformable layer sufficiently wets out the microstructured surface to render the microstructured surface invisible to a writing laser. These techniques are described in more detail below.

In this disclosure, laser-personalizable security articles are presented along with methods of making these laser-personalizable security articles and the use of them to form personalized security articles.

Unless otherwise indicated, all numbers expressing feature sizes, amounts, and physical properties used in the specification and claims are to be understood as being modified in all instances by the term "about" Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

As used herein, the term "adjacent" when referring to layers or films, means that the layers or films are in close proximity to each other with no empty space between them. The layers or films may be touching or there may be intervening layers or films.

Unless otherwise indicated, "optically transparent" refers to an article, film or adhesive that has a high light transmittance over at least a portion of the visible light spectrum (about 400 to about 700 nm). The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

The term "adhesive" as used herein refers to polymeric compositions useful to adhere together two adherends. Examples of adhesives are pressure sensitive adhesives. Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Disclosed herein are laser-personalizable security articles that comprise a multi-layer security document. The multi-layer security document comprises an optically transparent cover layer, a composite image, and an imagable layer. The multi-layer security document is so arranged that the composite image is a first level of security, and the imagable layer is designed to permit personalized laser writing to give a second level of security. Besides these two levels of security, the security articles of this disclosure may also contain optional additional security features that have been developed to authenticate documents of value and thus prevent forgers from producing a document which resembles the authentic document. These optional additional security features include overt, covert, or electronic security features. Overt security features include holograms and other diffractive optically variable images, embossed images, Guilloche security print, rainbow Guilloche security print, colorshifting security print, and colorshifting films. Covert security features include images only visible under certain conditions such as inspection under light of a certain wavelength, polarized light, retroreflected light, or magnification. Electronic security features include biometric data stored on contactless, contact, or dual interface modules. Even more sophisticated systems require specialized electronic equipment to inspect the document and verify its authenticity. Each of the components of the laser-personalizable security articles is described in greater detail below.

The multi-layer security document includes an optically transparent cover layer. This cover layer has a first surface, a second surface, and a thickness between the first surface and the second surface. The cover layer typically is a film layer, but it may also be for example a substrate layer, meaning that it is more rigid than a film layer.

Figure 2:
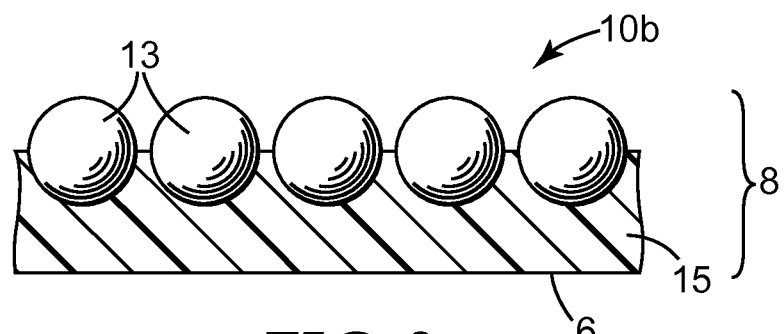
FIG. 2 is an enlarged cross sectional view of an "exposed lens" microlens sheeting.

Particularly suitable cover layers are microlens sheeting such as described in U.S. Pat. No. 6,288,842 (Florczak et al.) and US Patent Publication No. 2007/0081254 (Endle et al.). The microlens sheeting comprises one or more discrete layers of microlenses with a layer of material adjacent to one side of the microlens layer or layers. For example, FIG. 1 illustrates one embodiment of a suitable type of microlens sheeting 10a. This sheeting comprises a transparent cover layer 8 having first and second surfaces, the second surface 6 being substantially planar and the first surface 11 having an array of substantially spherical or aspherical microlenses 4. The cover layer 8 may optionally comprise sub-layer 14 (described below), or cover layer 8 may be a single layer. The second surface 6 comprises a composite image as described in more detail below. FIG. 2 illustrates another embodiment of a suitable type of microlens sheeting 10b. The shape of the microlenses and thickness of the base sheet and their variability are selected such that light appropriate for viewing the sheeting is focused approximately at the second surface 6. In this embodiment, the microlens sheeting of cover layer 8 includes a monolayer of transparent microspheres 13 that are partially embedded in a material layer 15, which is also typically a bead binder layer, such as a polymeric material. The layer of material 15 includes a second surface 6 comprising a composite image as described in more detail below. The microspheres 13 are transparent both to the wavelengths of radiation that may be used to form the composite image (explained in more detail below), as well as to the wavelengths of light in which the composite image will be viewed. This type of sheeting is described in greater detail in U.S. Pat. No. 3,801,183, except where the bead bond layer is very thin, for instance, to the extent where the bead bond layer is only between the beads, or occupying the interstitial spaces between the beads. Alternatively, this type of sheeting can be made by using microspheres of an appropriate optical index for focusing radiation approximately on the second surface 6 of the layer of material 15 when the bead bond is of the thickness taught in U.S. Pat. No. 3,801,183. Such microspheres include polymethyl methylacrylate beads, which are commercially available from Esprix Technologies based in Sarasota, Fla.

The microlenses of the sheeting 10a and 10b typically have image forming refractive elements in order for image formation (described in more detail below) to occur; this is generally provided by forming spherically or aspherically shaped features. Other useful materials that provide a gradient refractive index (GRIN) will not necessarily need a curved surface to refract light. The microlenses may have any symmetry, such as cylindrical or spherical, provided real images are formed by the refraction surfaces. The microlenses themselves can be of discrete form, such as round plano-convex lenslets, round double convex lenslets, Fresnel lenslets, diffractive lenslets, rods, microspheres, beads, or cylindrical lenslets. Materials from which the microlenses can be formed include glass, polymers, minerals, crystals, semiconductors and combinations of these and other materials. Non-discrete microlens elements may also be used. Thus, microlenses formed from a replication or embossing process (where the surface of the sheeting is altered in shape to produce a repetitive profile with imaging characteristics) can also be used.

Microlenses with a uniform refractive index of between 1.4 and 3.0 over the visible and infrared wavelengths are typical, more typically between 1.4 and 2.5 and even more typically between 1.45 and 1.55. The refractive power of the microlenses, whether the individual microlenses are discrete or replicated, and regardless of the material from which the microlenses are made, is desirably such that the light incident upon the optical elements will focus on or near the second surface 6 of cover layer 8. In certain embodiments, the microlenses typically form a demagnified real image at the appropriate position on that layer. The construction of the microlens sheeting provides the necessary focusing conditions so that energy incident upon the front surface of the microlens sheeting is approximately focused on or near the second surface 6 of cover layer 8.

Microlenses with diameters ranging from 15 micrometers to 275 micrometers are particularly suitable, though other sized microlenses may be used. Good composite image resolution can be obtained by using microlenses having diameters in the smaller end of the aforementioned range for composite images that are to appear to be spaced apart from the microlens layer by a relatively short distance, and by using larger microlenses for composite images that are to appear to be spaced apart from the microlens layer by larger distances. Other microlenses, such as plano-convex, spherical or aspherical microlenses having lenslet dimensions comparable to those indicated for the microlenses, can be expected to produce similar optical results. Cylindrical lenses having lenslet dimensions comparable to those indicated for the microlenses can be expected to produce similar optical results, although different or alternative imaging optics train may be required.

As noted above, a layer of material 14 in FIG. 1 may be provided adjacent to the microlenses in the microlens sheeting 10a. This layer of material is referred to herein as a "spacing layer" or "spacing film". Suitable materials for the spacing layer 14 in the sheeting 10a include silicone, polyester, polyurethane, polycarbonate, polypropylene, or any other polymer capable of being made into sheeting or being supported by the microlens sheeting 10a. In one embodiment, the cover layer 8 may include a microlens layer 10a and a spacing layer 14 that are made from different materials. For example, the microlens layer may include acrylates, and the spacing layer may include polyester. In other embodiments, the sheeting 10a may include a microlens layer and a spacing layer that are made from the same materials. For example, the microlens and spacing layer of the cover layer 8 may be made of silicone, polyester, polyurethane, polycarbonate, polypropylene, or any other polymer capable of being made into sheeting, and may be formed by methods of mechanical embossing, replication or molding.

As described above, the thickness of the cover layer is selected such that the focal plane of the microlenses is at or near the location of the second surface 6.

Because the microlens sheeting forms an exterior surface of a security article it is desirable that the microlens sheeting be durable to withstand the processing steps to form the security article as well as normal use conditions for the security article. The process to prepare security articles may involve steps such as lamination with heat and pressure, and therefore it is desirable that the surface be sufficiently robust to withstand these conditions. In addition, this surface is desirably sufficiently robust to withstand end use conditions of the formed articles including exposure to scratching, staining, solvents, chemicals, ultraviolet light, visible light, and physical stresses. In some embodiments, the microlens sheeting is prepared from a crosslinked material to provide dimensional stability, such as, for example, a crosslinked (meth)acrylate material. In some embodiments, a highly crosslinked (meth)acrylate material is used which contains highly functionalized (meth)acrylate monomers. By highly functionalized (meth)acrylate monomers, is it meant (meth) acrylate monomers with a functionality greater than two, such as, for example, trifunctional (meth)acrylate monomers, tetrafunctional (meth)acrylate monomers, or pentafunctional (meth)acrylate monomers.

Additionally, while generally not necessary, it may be desirable to have a surface coating on the microlens surface of the cover layer. This surface coating can be useful to prevent soiling, scratching, etc of the microlens surface. A wide variety of surface coatings are suitable as long as they do not interfere with the optical and mechanical properties of the microstructured surface of the microlens sheeting. Examples of suitable coatings include, for example, optically transparent release coatings.

On the second surface of the cover layer is located a composite image. As used herein, the term "composite image", refers to a composite image, provided by individual partially complete images and/or individual complete images associated with a number of the microlenses, that appears to be suspended, or to float above, in the plane of, and/or below the sheeting. These suspended images are referred to for convenience as floating images, and they can be located above or below the sheeting (either as two or three-dimensional images), or can be a three-dimensional image that appears above, in the plane of, and below the sheeting. The images can be in black and white or in color, and can appear to move with the observer. Unlike some holographic sheetings, imaged sheeting of the present disclosure cannot be used to create a replica of itself. Additionally, the floating image(s) can be observed by a viewer with the unaided eye. The composite image comprises a collection of complete or partial images located on the second surface of the cover layer such that when viewed through the microstructured surface of the cover layer a composite image is formed that may be for example a floating three dimensional image.

The collection of complete or partial images that form the composite image (sometimes referred herein as the first composite image) may be formed on the second surface of the cover layer using the techniques described in U.S. Pat. No. 6,288,842 (Florczak et al.) and US Patent Publication No. 2007/0081254 (Endle et al.) or within the cover layer using the techniques described in U.S. Pat. No. 7,336,422 (Dunn et al.).

The disclosure of Florczak et al. provides a method of forming a composite image on a microlens sheeting by directing diverging or converging light rays onto the microlens sheeting.

The energy of the light rays is focused by the individual microlenses onto a material layer that is radiation sensitive. The focused energy modifies the radiation sensitive layer to provide an image.

The disclosure of Endle et al. also provides a method of forming a composite image on a microlens sheeting. The method comprises the steps of: providing a sheeting having an array of microlenses and a material layer adjacent the array of microlenses; providing a first donor substrate adjacent the material layer of the sheeting, where the first donor substrate is radiation sensitive; providing a radiation source; and transferring at least a portion of the first donor substrate to the sheeting using the radiation source to form individual, partially complete images on the material layer.

The first composite image provides a first level of security by providing, for example, a three dimensional floating image that cannot be used to create a replica of itself, and can be observed by a viewer with the unaided eye.

Just as the first composite image provides the first level of security, the imagable layer provides the second level of security, by providing a layer that is laser-personalizable such that additional, personalizable information can be imaged onto the imagable layer to provide a security article with a first composite image and personalized security information in the form of a second composite image.

The imagable layer comprises a laser imagable layer. The term "laser imagable" as used herein refers to a layer or set of layers that upon exposure to laser radiation forms an image. Typically, the imagable layer is a radiation sensitive material layer.

Radiation sensitive materials useful for this disclosure include coatings and films of metallic, polymeric and semiconducting materials as well as mixtures of these. As used herein, a material is "radiation sensitive" if upon exposure to a given level of visible or other radiation the appearance of the material exposed changes to provide a contrast with material that was not exposed to that radiation. The image created thereby could thus be the result of a compositional change, a removal or ablation of the material, a phase change, or a polymerization of the radiation sensitive coating. Examples of some radiation sensitive metallic film materials include aluminum, silver, copper, gold, titanium, zinc, tin, chromium, vanadium, tantalum, and alloys of these metals. These metals typically provide a contrast due to the difference between the native color of the metal and a modified color of the metal after exposure to the radiation. The image, as noted above, may also be provided by ablation, or by the radiation heating the material until an image is provided by optical modification of the material. U.S. Pat. No. 4,743,526, for example, describes heating a metal alloy to provide a color change.

In addition to metallic alloys, metallic oxides and metallic suboxides can be used as a radiation sensitive medium. Materials in this class include oxide compounds formed from aluminum, iron, copper, tin and chromium. Non-metallic materials such as zinc sulfide, zinc selenide, silicon dioxide, indium tin oxide, zinc oxide, magnesium fluoride and silicon can also provide a color or contrast that is useful for this disclosure.

Multiple layers of thin film materials can also be used to provide unique radiation sensitive materials. These multi-layer materials can be configured to provide a contrast change by the appearance or removal of a color or contrast agent. Exemplary constructions include optical stacks or tuned cavities that are designed to be imaged (by a change in color, for example) by specific wavelengths of radiation. One specific example is described in U.S. Pat. No. 3,801,183, which discloses the use of cryolite/zinc sulphide ($Na_3AlF_6$/ZnS) as a dielectric mirror. Another example is an optical stack composed of chromium/polymer (such as plasma polymerized butadiene)/silicon dioxide/aluminum where the thickness of the layers are in the ranges of 4 nm for chromium, between 20 nm and 60 nm for the polymer, between 20 nm and 60 nm for the silicon dioxide, and between 80 nm and 100 nm for the aluminum, and where the individual layer thicknesses are selected to provide specific color reflectivity in the visible spectrum. Thin film tuned cavities could be used with any of the single layer thin films previously discussed. For example, a tuned cavity with an approximately 4 nm thick layer of chromium and the silicon dioxide layer of between about 100 nm and 300 nm, with the thickness of the silicon dioxide layer being adjusted to provide a colored imaged in response to specific wavelengths of radiation. Another example is US Patent Publication No. 2008/0160185.

Radiation sensitive materials useful for use in this disclosure also include thermochromic materials. "Thermochromic" describes a material that changes color when exposed to a change in temperature. Examples of useful thermochromic materials are described in U.S. Pat. No. 4,424,990, and include copper carbonate, copper nitrate with thiourea, and copper carbonate with sulfur containing compounds such as thiols, thioethers, sulfoxides, and sulfones. Examples of other suitable thermochromic compounds are described in U.S. Pat. No. 4,121,011, including hydrated sulfates and nitrides of boron, aluminum, and bismuth, and the oxides and hydrated oxides of boron, iron, and phosphorus.

In some embodiments, the imagable layer is a laser charable layer or layers, in other embodiments, the imagable layer comprises a multi-layer film article that form images upon exposure to laser radiation.

Examples of laser charable layers include, for example, layers of materials such as polycarbonate that contain additives that absorb laser radiation. A variety of melt-extrudable laser absorbing additives are suitable, many are commercially available from a variety of sources. The additives may be organic, inorganic (in particular metal oxides), or a hybrid. They may also be dyes, pigments, nanoparticles or the like. Some infrared absorbing dyes include nickel-based, palladium-based, and platinum-based dyes available from Epolin under the trade name "EPOLIGHT". Both linear and non-linear absorbing additives may be suitable. The absorption of laser radiation by the additives causes localized heating and consequent charring to occur. Since the polycarbonate layer typically is transparent with a white background, the localized black char spots can form a black and white image.

A wide variety of multi-layer film articles that form images upon exposure to laser radiation are suitable. One embodiment for preparing color images is described in US Patent Publication No. 2011/0063392 and PCT Publication No. WO 2009/140088. This embodiment comprises a multi-layer construction wherein at least one layer comprises a thermally activatable composition, and is hereinafter referred to as a thermally activatable layer, and in which the thermally activatable composition comprises a non-linear light to heat converter composition and a color forming compound; and activating the at least one thermally activatable layer with a light source to form an image. The thermally activatable composition may optionally comprise a thermal acid generator and/or a fixing compound. In some embodiments, the light source comprises a focused laser. In other embodiments, the multi-layer construction comprises more than one thermally activatable layer. After exposing the multiple thermally activatable layers to the light source, an image, or portions of an image, forms on each of the thermally activatable layers, thus forming an image on the construction.

The image is formed by selectively activating one or more thermally activatable layers with a light source. Generally the light source is a collimated light source such as a laser. Laser light sources are particularly useful because they are able to provide localized activation, that is, selective activation of a voxel on a single layer within multiple layers. Particularly useful are lasers that are combined with focusing optics to focus the laser output to a specific location along the z axis.

It is desirable that a single laser be able to activate all of the thermally activatable layers. It is also desirable that all thermally activatable layers be activated in a single pass with that laser.

Localized activation, such as activation of a single voxel within a layer, aids in the formation of well-resolved images when the layers within a multi-layer construction form different colors upon activation.

Unlike other multi-layer systems in which each layer is responsive to a different laser wavelength, the multi-layer construction of this disclosure permits color image formation with a single laser. The selective activation is achieved through the use of focusing optics to focus the laser output to a specific location along the z axis. In some embodiments, the laser pulse duration is from 100 picoseconds to 1 microsecond.

Many lasers emit beams with a Gaussian profile, in which case the laser is said to be operating on the fundamental transverse mode, or "TEM$_{00}$ mode" of the laser's optical resonator. The Gaussian beam is a beam of electromagnetic radiation whose transverse electric field and intensity (irradiance) distributions are described by Gaussian functions. For a Gaussian beam, the spot size, w(z), is defined as the radius of the circle around the z axis when the intensity at the circle is 1/e$^2$ to that of the center of the circle. When an incident laser beam is focused by a lens, the propagated laser beam spot size, w(z), will be at a minimum value w$_0$ at one place along the beam propagation axis, z, known as the beam waist.

For a beam of wavelength λ at a distance z along the beam from the beam waist, the variation of the spot size is given by equation 1:

$$w(z) = w_0 \sqrt{1 + \left(\frac{z}{z_0}\right)^2} \quad (1)$$

where the origin of the z-axis is defined, without loss of generality, to coincide with the beam waist, and where z$_0$ is called the Rayleigh range and is defined by equation 2:

$$z_0 = \frac{\pi w_0^2}{\lambda}. \quad (2)$$

At a distance from the beam waist equal to the Rayleigh range z$_0$, the width, w, of the beam is defined by equation 3:

$$w(\pm z_0) = w_0 \sqrt{2} \quad (3).$$

The distance between these two points (+z$_0$ and −z$_0$) is called the confocal parameter, b, or the depth of focus of the beam, and is 2 times the Rayleigh range z$_0$.

Another way to describe the laser focus is by the numerical aperture (usually abbreviated NA), which is the refractive index of the lens material, n, times the sine of the half angle, Θ, of the cone of the focus as shown in equation 4 below:

$$NA = n * \sin\frac{\Theta}{2} \approx \frac{D}{2f} \quad (4)$$

where f is the focal length of the focusing lens and D is the diameter of the lens or the diameter of the laser beam coming into the lens.

The spot size of the focused beam is determined by the numerical aperture defined in equation 4. If the beam incident on the lens has a constant transverse profile, i.e., a flat top beam, the focused spot has an intensity profile described by the Airy disc where the diameter (2w$_o$) of the first dark ring is given by equation 5 below:

$$2w_0 = 1.22\frac{\lambda}{NA} \quad (5)$$

where λ is the laser wavelength. The focused spot size is inversely related to the NA. A comparison of equations 3 and 5, demonstrates that the depth focus of the beam, 2z$_0$, is directly related to the laser wavelength and inversely related to the square of NA. The focal plane of a focused laser is therefore actually a three dimensional volume whose thickness is given by the depth of focus.

Alternatively the image can be formed by using multi-layer films to selectively pass or block polarized laser light, thereby either selectively activating thermally activatable layers as described in co-pending applications "Multi-layer Articles Capable of Forming Color Images and Methods of Forming Color Images" Attorney Docket No. 66498US002 filed Jun. 30, 2010 and "Multi-layer Articles Capable of Forming Color Images and Methods of Forming Color Images" Attorney Docket No. 66267US002 filed Jun. 30, 2010.

Other embodiments of a multi-layer film article involve a colored background layer and one or more layers or opaque film covering the background layer. In these embodiments, the image is formed by selectively exposing the background layer. The selective exposure can be made by etching away portions of the film as described in, for example, US Patent Publication No. 2008/0160185 or by changing the refractive index of portions of the film layer, changing the film from opaque to transparent as described in PCT Publication No. WO 2010/075373 (Merrill et al.).

Figure 3:
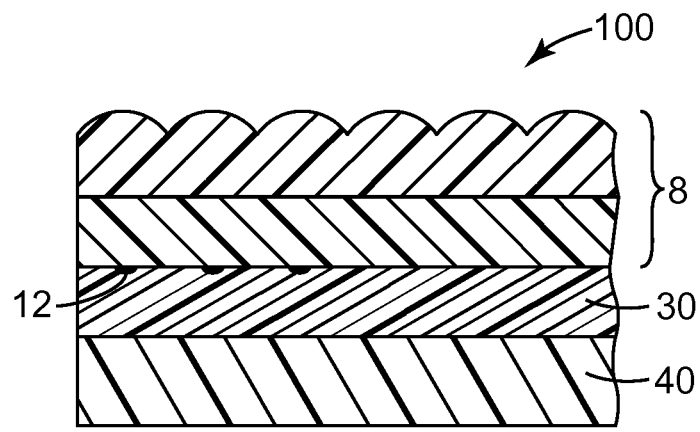
FIG. 3 is an enlarged cross sectional view of an embodiment of a laser-personalizable security article of this disclosure.

An embodiment of a laser-personalizable security document of this disclosure is shown in FIG. 3. In FIG. 3, laser-personalizable security document 100 comprises cover layer 8, first composite image 12, imagable layer 30 and optional layer or layers 40. Note that first composite image 12 is merely descriptive, is not to scale, and is not designated to show alignment with the microlenses through which the image is viewed.

In order to image the imagable layer with a laser, the laser radiation must be able to pass through the cover layer. If the portion of the imagable layer that is to be personalized is covered by a cover layer that has a microstructured surface, the microlenses or lenticular surface of the microstructured surface can interfere with the laser radiation and effectively block laser personalization. This function of the microstructured surface helps to prevent tampering with the security function of the article by preventing subsequent imaging of the imagable layer, but it also blocks the desired personalization as well.

In order to image through the microstructured surface, specialized optics are used with the writing laser. This is described below.

A variety of three dimensional imaging processes may be used to prepare the personalized composite image on the imagable layer. The personalized composite image may comprise a wide range of personalized information, such as, for example, a photograph, a signature, identification numbers (e.g. social security numbers, driver's license numbers, address, phone number, account numbers, etc.), biometric information, or other personalized information. A particularly suitable method is described in U.S. Pat. No. 6,288,842 (Florczak et al.). U.S. Pat. No. 6,288,842 (Florczak et al.) discloses that floating images on microlens sheeting are created as a result of a compositional change, a removal or ablation of the material, a phase change, or a polymerization of the coating disposed adjacent to one side of the microlens layer or layers.

Generally, the imaging method will vary depending upon whether one desires to prepare a composite image that floats above the lens sheeting or below the lens sheeting. To prepare a three dimensional image that appears to float above the lens sheeting, referring to FIG. 4, incident radiation 300 (light, in this example) is directed onto a light diffuser 301 to homogenize any non-uniformities and produces light 300a, that is collimated by collimator 302 that directs the light 300b towards a diverging lens 305a. From the diverging lens, the light rays 300c diverge toward laser-personalizable security article 100 (see FIG. 3).

The energy of the light rays impinging upon the laser-personalizable security article 100 is focused by the individual microlenses of cover layer 8 onto the imagable layer 30 (cover layer 8 and imagable layer 30 are not shown in this figure). This focused energy modifies the imagable layer 30 to provide an image, the size, shape, and appearance of which depends on the interaction between the light rays and the imagable layer.

Figure 4:
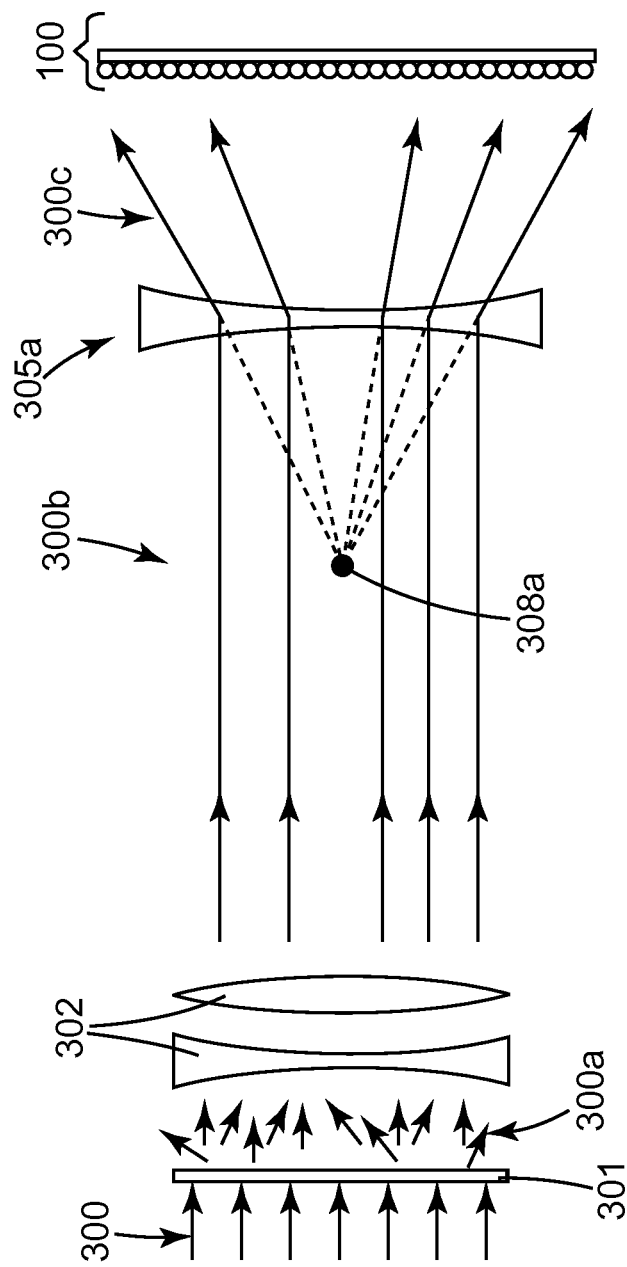
FIG. 4 is a geometrical optical representation of the formation of a composite image that appears to float above the microlens sheeting.

The arrangement shown in FIG. 4 would provide a sheeting having a composite image that appears to an observer to float above the sheeting, because diverging rays 300c, if extended backward through the lens, would intersect at the focal point 308a of the diverging lens. Stated differently, if a hypothetical "image ray" were traced from the imagable layer through each of the microlenses and back through the diverging lens, they would meet at 308a which is where the composite image appears.

Figure 5:
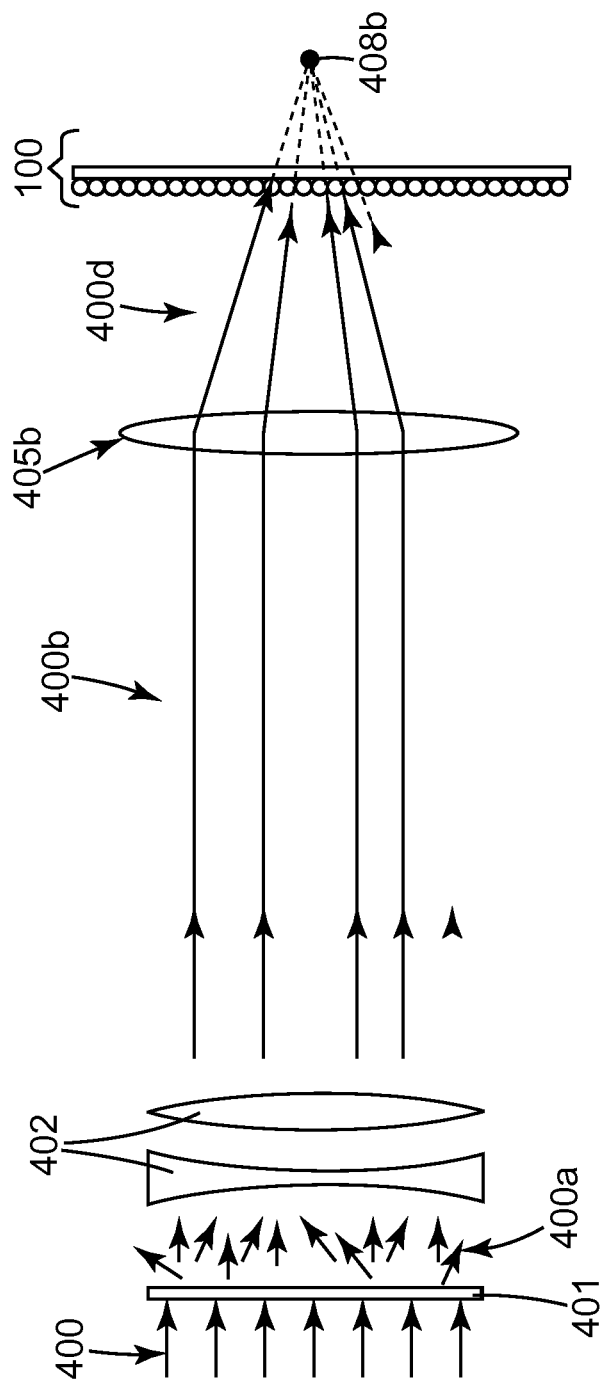
FIG. 5 is a geometrical optical representation of the formation of a composite image that appears to float below the microlens sheeting.

A composite image may also be provided that appears to be suspended on the opposite side of the sheeting from the observer. This floating image that floats below the sheeting can be created by using a converging lens instead of the diverging lens 305a shown in FIG. 4. Referring to FIG. 5, the incident energy 400 (light, in this example) is directed onto a diffuser 401 to homogenize any non-uniformities in the light source. The diffuse light 400a is then collected and collimated in a collimator 402 that directs the light 400b toward a converging lens 405b. From the converging lens, the light rays 400d are incident on the laser-personalizable security article 100 (see FIG. 3), which is placed between the converging lens and the focal point 408b of the converging lens.

The energy of the light rays impinging upon the laser-personalizable security article 100 is focused by the individual microlenses of cover layer 8 onto the imagable layer 30 (cover layer 8 and imagable layer 30 are not shown in this figure). This focused energy modifies the imagable layer 30 to provide an image, the size, shape, and appearance of which depends on the interaction between the light rays and the imagable layer. The arrangement shown in FIG. 5 would provide a sheeting having a composite image that appears to an observer to float below the sheeting as described below, because converging rays 400d, if extended through the sheeting, would intersect at the focal point 408b of the converging lens. Stated differently, if a hypothetical "image ray" were traced from the converging lens 405b through each of the microlenses and through the images in the material layer associated with each microlens, they would meet at 408b, which is where the composite image appears.

Also disclosed herein are methods of preparing laser-personalizable security articles. The methods to prepare a laser-personalizable security article comprise providing an optically transparent cover layer sheet with a first surface, a second surface, and a thickness between the first surface and the second surface, providing a first composite image, providing an imagable layer sheet, and forming a laminate by laminating the second surface of the cover layer sheet to the imagable layer sheet.

The first surface of the cover layer sheet is at least partially a microstructured surface, wherein the microstructured surface forms microlenses or a lenticular surface. The first composite image comprises a collection of complete or partial images located such that when viewed through the microstructured surface of the cover layer, the collection of complete or partial images forms the first composite image. The imagable layer comprises a laser imagable layer. The microstructured surface, the composite image and the imagable layer have all been described above.

In some embodiments, lamination comprises adhesive bonding and in other embodiments lamination comprises the application of heat and pressure. Typically when heat and pressure are applied, equipment such as a platen press or similar types of equipment are used to supply the heat and pressure.

Typically, the collection of complete or partial images that form the first composite image are located on or within the second surface of the cover layer and the cover layer thickness is such that the second surface of the cover layer is within the focal plane of the microlenses, which has a thickness described by equation 3 above. Generally, the collection of complete or partial images that form the first composite image are printed or laser written as described for example in U.S. Pat. No. 6,288,842 (Florczak et al.) and US Patent Publication No. 2007/0081254 (Endle et al.). The color image may be a black and white image, but more typically is a color image.

In some embodiments, the microstructured surface of the cover layer sheet is not uniform. The surface of the cover layer may contain microstructure elements in some areas and not in others, or the microstructure elements may be different in different locations. Having different microstructure elements can mean that the microlenses formed by the microstructure elements are different. This difference can result in microlenses with different effective focal lengths at different locations on the surface of the cover layer. Thus images could then be generated at different depths of the security article other than the second surface of the cover layer.

In some embodiments, the cover layer is a multi-layer construction and may comprise a cover film and a spacing film. Such a construction was described above and in FIG. 1.

In some embodiments it may be desirable to add two dimensional personalized information to the security article as well as the three dimensional floating images described above. However, in order to write two dimensional personalized information to the imagable layer with a laser, the laser radiation must be able to pass through the cover layer. If the portion of the imagable layer that is to be two dimensionally personalized is covered by a cover layer that has a microstructured surface, the microlenses or lenticular surface of the microstructured surface can interfere with the laser radiation and effectively block laser personalization. This function of the microstructured surface helps to prevent tampering with the security function of the article by preventing subsequent imaging of the imagable layer, but it also blocks the desired personalization as well.

In order to make the imagable layer two dimensionally laser writable, the microstructured surface is rendered invisible to a writing laser. By this it is meant that the microstructured surface has no intrinsic refraction, reflection, or absorbance at the laser wavelength. One method that this may be achieved is through the use of removable processing tape.

Examples of suitable processing tapes are more fully described in co-pending application "Processing Tapes For Preparing Laminate Articles" Attorney Docket No. 67436US002 filed the same day as the present application. Typically, the processing tape comprises an optically transparent backing and an optically transparent pressure sensitive adhesive layer. The pressure sensitive adhesive layer sufficiently wets out on the microstructured surface to render the microstructured surface invisible to a writing laser. Typically the pressure sensitive adhesive has a refractive index in the range of 1.45-1.55. In some embodiments it is desirable that the pressure sensitive adhesive have a refractive index that is within 0.05 of the refractive index of the microstructured surface.

When a processing tape is used, the processing tape is laminated to the microstructured surface of the article and the article is two dimensionally personalized by the selective application of radiation using, for example, a laser. Typically, this two dimensional laser personalization will form an image or images on the laser imagable layer. Upon completion of two dimensional laser personalization the processing tape can be removed to provide a laser-personalizable security article that contains not only the composite image but also two dimensional personalized information. This laser-personalizable article can then be three dimensionally laser personalized using the three dimensional imaging process described above.

Also disclosed herein are personalized security documents. These personalized security documents are prepared by personalized laser imaging of the personalizable security articles and using the three dimensional imaging processes described above.

The personalized multi-layer security documents comprise a transparent cover layer, a first composite image, and an imaged layer comprising at least one personalized image (a second composite image). The transparent cover layer has a first surface, a second surface, and a thickness between the first surface and the second surface. The first surface is at least partially a microstructured surface, wherein the microstructured surface forms microlenses or a lenticular surface. The first composite image is a collection of complete or partial images located such that when viewed through the microstructured surface of the cover layer, the collection of complete or partial images forms the first composite image. The imaged layer is located adjacent to the cover layer and typically comprises at least one laser imaged personalized three dimensional composite image.

The first and second composite images typically are located on or within the second surface of the cover layer and the cover layer thickness is such that the second surface of the cover layer is within the focal plane of the microlenses, which has a thickness described by equation 3 above. Composite images have been described in detail above.

The personalized multi-layer security document may contain additional optional layers such as, for example, an additional transparent layer between the cover layer and the imaged layer.

Figure 6:
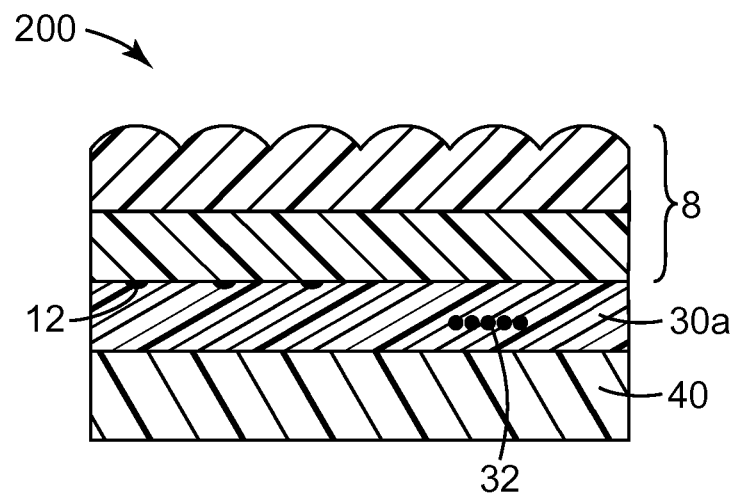
FIG. 6 is an enlarged cross sectional view of an embodiment of a laser-personalized security article of this disclosure.
Figure 7:
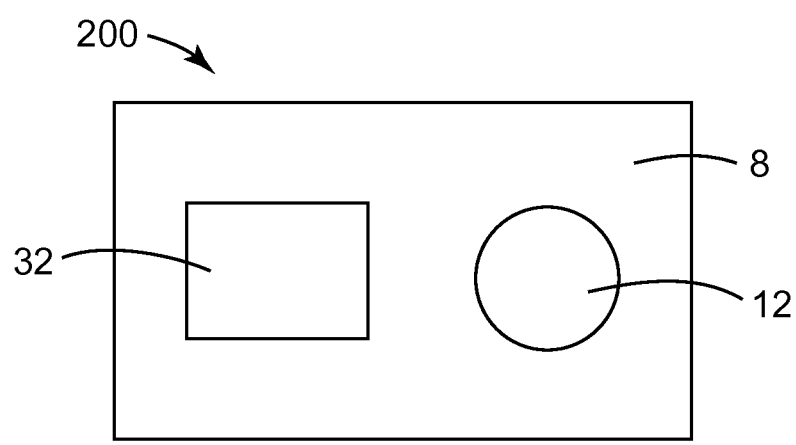
FIG. 7 is a top view of an embodiment of a laser-personalized security article of the present disclosure.

An embodiment of a laser-personalized security article of this disclosure is shown in FIGS. 6 and 7. FIG. 6 shows a cross sectional view of laser-personalized security article 200, and FIG. 7 shows a top view of the same laser-personalized security article 200. Laser-personalized security article 200, is laser-personalizable article 100 of FIG. 3 after having undergone an imaging process as described in FIG. 4 or 5. In FIG. 6, laser-personalized security article 200 comprises cover layer 8, first composite image 12, imaged layer 30a containing three dimensional personalized composite image 32, and optional layer or layers 40. Note that composite image 32, like composite image 12 is merely descriptive, is not to scale, and is not designated to show alignment with the microlenses through which the image is viewed.

In FIG. 7, laser-personalized security article 200 shows the top surface of cover layer 8, composite image 12 and three dimensional personalized image 32. Three dimensional personalized image 32 may comprise a series of images and/or personal information.

The present disclosure includes the following embodiments.

Among the embodiments are laser-personalizable security articles. A first embodiment includes a laser-personalizable security article comprising: a multi-layer security document, the multi-layer security document comprising: an optically transparent cover layer with a first surface, a second surface, and a thickness between the first surface and the second surface, the first surface being at least partially a microstructured surface, wherein the microstructured surface forms microlenses or a lenticular surface; a composite image, wherein the composite image comprises a collection of complete or partial images located such that when viewed through the microstructured surface of the cover layer, the collection of complete or partial images forms the composite image; and an imagable layer wherein the imagable layer comprises a laser imagable layer.

Embodiment 2 is the article of embodiment 1, wherein the collection of complete or partial images is located on or within the second surface of the cover layer.

Embodiment 3 is the article of embodiment 1 or 2, wherein the microstructured surface comprises microlenses, and the cover layer thickness is such that the second surface of the cover layer is within the focal plane of the microlenses.

Embodiment 4 is the article of embodiment 2 or 3, wherein the collection of complete or partial images is printed or laser written.

Embodiment 5 is the article of any of embodiments 1-4, wherein the composite image comprises a color image.

Embodiment 6 is the article of any of embodiments 1-5, wherein the cover layer comprises a multi-layer construction comprising a cover film and a spacing film.

Embodiment 7 is the article of any of embodiments 1-6, wherein the imagable layer comprises a laser charable layer, or a laser writable multi-layer film article.

Embodiment 8 is the article of any of embodiments 1-7, wherein the security document comprises additional layers.

Embodiment 9 is the article of any of embodiments 1-8, further comprising at least one additional transparent layer between the cover layer and the imagable layer.

Embodiment 10 is the article of any of embodiments 1-9, wherein the imagable layer further comprises a two dimensional image.

Embodiment 11 is the article of any of embodiments 1-10, wherein different portions of the microstructured surface form different microlenses.

Embodiment 12 is the article of any of embodiments 1-11, wherein the microstructured surface comprises a crosslinked (meth)acrylate material.

Among the embodiments are laser-personalized security documents. Embodiment 13 includes a laser-personalized security document comprising: an optically transparent cover layer with a first surface, a second surface, and a thickness between the first surface and the second surface, the first surface being at least partially a microstructured surface, wherein the microstructured surface forms microlenses or a lenticular surface; a first composite image, wherein the first composite image comprises a collection of complete or partial images located such that when viewed through the microstructured surface of the cover layer, the collection of complete or partial images forms the first composite image; and an imaged layer located adjacent to the cover layer, wherein the imaged layer comprises at least one personalized laser imaged second composite image comprising a collection of complete or partial images such that when viewed through the microstructured surface of the cover layer the collection of complete or partial images forms the second composite image, and wherein there are no adhesive layers between the cover layer and the image layer.

Embodiment 14 is the laser-personalized security document of embodiment 13, wherein the collection of complete or partial images forming the first composite image is located on or within the second surface of the cover layer.

Embodiment 15 is the laser-personalized security document of embodiment 13 or 14, wherein the microstructured surface comprises microlenses, and the cover layer thickness is such that the second surface of the cover layer is within the focal plane of the microlenses.

Embodiment 16 is the laser-personalized security document of any of embodiments 13-15, wherein the collection of complete or partial images forming the first composite image is printed or laser written.

Embodiment 17 is the laser-personalized security document of any of embodiments 13-16, wherein the first composite image comprises a color image.

Embodiment 18 is the laser-personalized security document of any of embodiments 13-17, wherein the security document comprises additional layers.

Embodiment 19 is the laser-personalized security document of any of embodiments 13-18, further comprising at least one additional transparent layer between the cover layer and the imaged layer.

Embodiment 20 is the laser-personalized security document of any of embodiments 13-19, wherein the imaged layer further comprises a two dimensional image.

Embodiment 21 is the laser-personalized security document of any of embodiments 13-20, wherein the microstructured surface comprises a crosslinked (meth)acrylate material.

Among the embodiments are methods of preparing laser-personalizable security articles. Embodiment 22 includes a method of preparing a laser-personalizable security article comprising: providing an optically transparent cover layer sheet with a first surface, a second surface, and a thickness between the first surface and the second surface, the first surface being at least partially a microstructured surface, wherein the microstructured surface forms microlenses or a lenticular surface; providing a composite image, wherein the composite image comprises a collection of complete or partial images located such that when viewed through the microstructured surface of the cover layer, the collection of complete or partial images forms the composite image; and providing an imagable layer sheet, wherein the imagable layer comprises a laser imagable layer; and forming a laminate by laminating the second surface of the cover layer sheet to the imagable layer sheet.

Embodiment 23 is the method of embodiment 22, wherein the lamination comprises lamination with heat and pressure.

Embodiment 24 is the method of embodiment 22 or 23, wherein the microstructured surface comprises a second set of microlenses or second lenticular surface.

Embodiment 25 is the method of embodiment 24, wherein the second set of microlenses or second lenticular surface is different from the first set of microlenses or first lenticular surface.

Embodiment 26 is the method of any of embodiments 22-25, wherein the collection of complete or partial images is located on or within the second surface of the cover layer.

Embodiment 27 is the method of any of embodiments 22-26, wherein the microstructured surface comprises microlenses, and the cover layer thickness is such that the second surface of the cover layer is within the focal plane of the microlenses.

Embodiment 28 is the method of any of embodiments 22-27, wherein the collection of complete or partial images is printed or laser written.

Embodiment 29 is the method of any of embodiments 22-28, wherein the composite image comprises a color image.

Embodiment 30 is the method of any of embodiments 22-29, wherein the cover layer comprises a multi-layer construction comprising a cover film and a spacing film.

Embodiment 31 is the method of any of embodiments 22-30, wherein the imagable layer comprises a laser charable layer, a laser writable multi-layer film article, or a combination thereof.

Embodiment 32 is the method of any of embodiments 22-31, wherein the security document comprises additional layers.

Embodiment 33 is the method of any of embodiments 22-32, further comprising laminating a processing tape to at least a portion of the microstructured surface, wherein the processing tape comprises an optically transparent backing and an optically transparent pressure sensitive adhesive layer and wherein the pressure sensitive adhesive layer sufficiently wets out on the microstructured surface to render the microstructured surface invisible to a writing laser.

Embodiment 34 is the method of any of embodiments 22-33, wherein the microstructured surface comprises a crosslinked (meth)acrylate material.

Embodiment 35 is the method of any of embodiments 22-34, wherein the imagable layer further comprises a two dimensional image.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Nickname | Description |
|---|---|
| PSA-1 | A pressure sensitive adhesive polymer composition with a monomer ratio of 98/2 IOA/AA dissolved in MEK at 26% solids, prepared as described in U.S. Pat. No. 7,385,020, Example 1. |
| Acrylate Resin | A curable acrylate resin containing. 30 weight % "SR601" commercially available from Sartomer, Exton, PA; 30 weight % HDDA; 40 weight % "SR399" commercially available from Sartomer, Exton, PA; 1 weight % "TPO" commercially available from BASF, Florham Park, NJ; and 0.5 weight % initiator "TINUVIN 405" commercially available from CIBA, Hawthorne, NY. |
| MEK | Methyl ethyl ketone |
| IOA | Iso-octyl acrylate |
| AA | Acrylic acid |
| Crosslinker | Aziridine crosslinker, 1,1'-isophthaloylbis(2-methylaziridine), CAS 7652-64-4. |
| PC Backing | A 3 mil (75 micrometer) thick 3M Clear Polycarbonate Security Film commercially available from 3M Company, St. Paul, MN. |
| Primer | A water-based primer prepared as described in Step 1 of Synthesis Example SE1 below. |
| Silica Nanoparticles-1 | A dispersion of silica nanoparticles in water (14.5% solids) commercially available as NALCO 2326 commercially available from Nalco Company, Naperville, IL. |
| APS | 3-aminopropyltriethoxysilane, commercially available from OSi Specialties, Danbury, CT as "SILQUEST A-1100". |
| Surfactant | Nonionic surfactant X-100. |
| Release Liner | Release liner commercially available from CP Film, Martinsville, VA as "T50". |
| HDDA | Hexanediol di-acrylate |

Synthesis Example SE1

Preparation of Processing Tape

A processing tape was prepared by the steps described below.

Step 1: Preparation of Primer:

A water-borne primer was prepared by mixing together de-ionized water (436.75 grams), Silica Nanoparticles-1 (61.39 grams), APS (0.801 gram), Surfactant (1.20 grams), and 29% ammonium hydroxide (0.9648 gram).

Step 2: Preparation of Treated PC Backing:

A sample of PC Backing was surface treated by air corona treatment (0.75 Joules/cm$^2$ in air) and application of Primer. The Primer was applied using a #3 Meyer Rod to give a nominal wet thickness of 100 nanometers. The PC Backing was then dried in a 110° C. oven for 30 minutes.

Step 3: Preparation of Pressure Sensitive Adhesive Layer:

A solvent-borne pressure sensitive adhesive composition was prepared by mixing together PSA-1 and 0.5% by dry weight of Crosslinker. The solvent-borne pressure sensitive adhesive composition was coated on Release Liner using a knife coater to give a wet thickness of 6 mils (152 micrometers), and then dried in a 120° C. oven for 15 minutes to give a dry thickness of approximately 0.9-1.1 mils (23-28 micrometers) to form an adhesive layer.

Step 4: Lamination to Form Tape:

A tape sample was made by laminating the treated PC Backing to the adhesive layer coated on a release liner.

Example 1

A microlens film sheet was produced by micro-replication of an array of tightly packed lenses with Acrylate Resin onto a roll of 100 micrometers (4 mils) thick 3M Clear Polycarbonate Security Film (3M Company, St. Paul, Minn.). The resulting lens film was approximately 123 micrometers thick. The replicated lenses had a 37.0 micrometer radius of curvature and a negative 0.931 conic constant. The diameter of each lens formed at the surface of the acrylate was 86 micrometers, with a center-to-center lens distance of 74 micrometers. The microlens film sheet was then imaged with color floating/sinking images to form the imaged lens film "A", following the process as that described in US Patent Publication 2007/0081254.

The cover film "A" was sheeted to 15.2 centimeter×15.2 centimeter (6 inch×6 inch) square sheets and stacked with the color floating/sinking image side down to other sheets of the same size to form the seven layer stack shown in Table 1 below.

TABLE 1

| Layer | Description |
|---|---|
| 1 | Cover Layer "A" |
| 2 | 100 micrometer thick 3M Laser Engravable Polycarbonate Security Film (3M Company, St. Paul, MN) |
| 3 | 100 micrometer thick 3M White Polycarbonate Security Film (3M Company, St. Paul, MN) |
| 4 | 100 micrometer thick 3M White Polycarbonate Security Film (3M Company, St. Paul, MN) |
| 5 | 100 micrometer thick 3M White Polycarbonate Security Film (3M Company, St. Paul, MN) |
| 6 | 100 micrometer thick 3M Laser Engravable Polycarbonate Security Film (3M Company, St. Paul, MN) |
| 7 | 50 micrometer thick 3M Clear Polycarbonate Security Film (3M Company, St. Paul, MN) |

The stack of films described by Table 1 was laminated with heat and pressure using a Carver press under typical polycarbonate card lamination conditions. These conditions are: heating the stack under 166° C. (330° F.), and 758 kiloPascals (110 psi) for 15 minutes, followed by cooling to room temperature under 758 kiloPascals (110 psi). Sample polycarbonate cards in the dimension of 8.56 centimeters× 5.40 centimeters (3.370 inches×2.125 inches) were punched out from the laminated stack.

The polycarbonate card was imaged by a SPI laser with a signature image. The laser beam was expanded using a Lynos 8× adjustable beam expander along with an Edmunds Optics 3× beam expander to a final 25 mm beam size. The beam then entered a HurryScan 25 galvo scanner made by Scanlab with a Sill Optics S4LFT0080/126 f-theta lens. The NA of this lens was approximately 0.15 given a floating image viewing angle of approximately 10 degrees. The f-theta lens was focused about 8 mm above the surface of the card. A floating black-and-white image was produced upon laser engraving. In this case, a polycarbonate card containing both color floating image and a laser-personalized black-and-white floating signature image on a white background was produced.

Example 2

A microlens film sheet was produced by micro-replication of an array of tightly packed lenses with Acrylate Resin onto a roll of 100 micrometers (4 mils) thick 3M Clear Polycarbonate Security Film (3M Company, St. Paul, Minn.). The resulting lens film was approximately 123 micrometers thick. The replicated lenses had a 37.0 micrometer radius of curvature and a negative 0.931 conic constant. The diameter of each lens formed at the surface of the acrylate was 86 micrometers, with a center-to-center lens distance of 74 micrometers. The microlens film sheet was then imaged with color floating/sinking images to form the imaged lens film "A", following the process as that described in US Patent Publication 2007/0081254.

Preparation of Color Shifting Film:

A roll of color-shifting opaque film was produced by building, in step-wise fashion, an eight layer thin film stack on top of a roll of 75 micrometers (3 mils) thick 3M Clear Polycarbonate Security Film (3M Company, St. Paul, Minn.). Layer 1 was sputtered titanium (about 2.5 nm), deposited onto the smooth side of the polycarbonate substrate. This layer is intended to serve as a substrate adhesion layer for layer 2, silver, also sputtered to a thickness of about 90 nm. The following layers, 3 through 8, are three sequential pairs of (a) polymer and (b) titanium, such as described in US Patent Publication No. 2008/0160185. The polymer layers were each about 210 nm thick and the titanium layers were each about 2.5 nm thick. When viewed from the coating side of the polycarbonate substrate, the color appearance produced by this coating stack appeared to be red near normal incidence and shifts to green at off-normal viewing angles. The color-shifting opaque film was converted to a rectangle patch of 30 mm×10 mm for incorporation into a stack of polycarbonate sheets as described below.

The cover film "A" was sheeted to 15.2 centimeter×15.2 centimeter (6 inch×6 inch) square sheets and stacked with the color floating/sinking image side down to other sheets of the same size to form the seven layer stack shown in Table 2 below, with the patch of the color shifting film placed between the cover layer "A" and the rest of the stack.

TABLE 2

| Layer | Description |
|---|---|
| 1 | Cover Layer "A" |
| Patch | Color Shifting Film |
| 2 | 100 micrometer thick 3M Laser Engravable Polycarbonate Security Film (3M Company, St. Paul, MN) |
| 3 | 100 micrometer thick 3M White Polycarbonate Security Film (3M Company, St. Paul, MN) |

TABLE 2-continued

| Layer | Description |
|---|---|
| 4 | 100 micrometer thick 3M White Polycarbonate Security Film (3M Company, St. Paul, MN) |
| 5 | 100 micrometer thick 3M White Polycarbonate Security Film (3M Company, St. Paul, MN) |
| 6 | 100 micrometer thick 3M Laser Engravable Polycarbonate Security Film (3M Company, St. Paul, MN) |
| 7 | 50 micrometer thick 3M Clear Polycarbonate Security Film (3M Company, St. Paul, MN) |

The stack of films described by Table 2 was laminated with heat and pressure using a Carver press under typical polycarbonate card lamination conditions. These conditions are: heating the stack under 166° C. (330° F.), and 758 kiloPascals (110 psi) for 15 minutes, followed by cooling to room temperature under 758 kiloPascals (110 psi). Sample polycarbonate cards in the dimension of 8.56 centimeters× 5.40 centimeters (3.370 inches×2.125 inches) were punched out from the laminated stack.

The patch of the color shifting film was imaged by a SPI laser with a signature image. The laser beam was expanded using a Lynos 8× adjustable beam expander along with an Edmunds Optics 3× beam expander to a final 25 mm beam size. The beam then entered a HurryScan 25 galvo scanner made by Scanlab with a Sill Optics S4LFT0080/126 f-theta lens. The NA of this lens was approximately 0.15 given a floating image viewing angle of approximately 10 degrees. The f-theta lens was focused about 8 mm above the surface of the card. A floating black-and-white image was produced upon laser engraving. In this case, a polycarbonate card containing both a color floating image and a laser-personalized silvery floating signature image on a color-shifting opaque patch was produced.

Example 3

A microlens film sheet was produced by micro-replication of an array of tightly packed lenses with Acrylate Resin onto a roll of 100 micrometers (4 mils) thick 3M Clear Polycarbonate Security Film (3M Company, St. Paul, Minn.). The resulting lens film was approximately 123 micrometers thick. The replicated lenses had a 37.0 micrometer radius of curvature and a negative 0.931 conic constant. The diameter of each lens formed at the surface of the acrylate was 86 micrometers, with a center-to-center lens distance of 74 micrometers. The microlens film sheet was then imaged with color floating/sinking images to form the imaged lens film "A", following the process as that described in US Patent Publication 2007/0081254.

The processing tape prepared in Synthesis Example SE1 was laminated to the microstructured surface of the microlens film sheet to form cover film "B".

The cover film "B" was sheeted to 15.2 centimeter×15.2 centimeter (6 inch×6 inch) square sheets and stacked with the color floating/sinking image side down to other sheets of the same size to form the seven layer stack shown in Table 3 below.

TABLE 3

| Layer | Description |
|---|---|
| 1 | Cover Layer "B" |
| 2 | 100 micrometer thick 3M Laser Engravable Polycarbonate Security Film (3M Company, St. Paul, MN) |
| 3 | 100 micrometer thick 3M White Polycarbonate Security Film (3M Company, St. Paul, MN) |

TABLE 3-continued

| Layer | Description |
|---|---|
| 4 | 100 micrometer thick 3M White Polycarbonate Security Film (3M Company, St. Paul, MN) |
| 5 | 100 micrometer thick 3M White Polycarbonate Security Film (3M Company, St. Paul, MN) |
| 6 | 100 micrometer thick 3M Laser Engravable Polycarbonate Security Film (3M Company, St. Paul, MN) |
| 7 | 50 micrometer thick 3M Clear Polycarbonate Security Film (3M Company, St. Paul, MN) |

The stack of films described by Table 3 was laminated with heat and pressure using a Carver press under typical polycarbonate card lamination conditions. These conditions are: heating the stack under 166° C. (330° F.), and 758 kiloPascals (110 psi) for 15 minutes, followed by cooling to room temperature under 758 kiloPascals (110 psi). Sample polycarbonate cards in the dimension of 8.56 centimeters×5.40 centimeters (3.370 inches×2.125 inches) were punched out from the laminated stack.

The sample polycarbonate cards were laser engraved with a portrait at 300 dots per inch (118 dots per centimeter) resolution by a MECCOMARK Fiber Laser Marking System equipped with a 20 W fiber laser. The processing tape was then removed by hand peel resulting in a polycarbonate card with both a color floating 3 dimensional image and a good 2 dimensional black-and-white personalized portrait image.

The polycarbonate card containing both a color floating 3 dimensional image and a good 2 dimensional personalized portrait image was imaged by a SPI laser with a signature image. The laser beam was expanded using a Lynos 8× adjustable beam expander along with an Edmunds Optics 3× beam expander to a final 25 mm beam size. The beam then entered a HurryScan 25 galvo scanner made by Scanlab with a Sill Optics S4LFT0080/126 f-theta lens. The NA of this lens was approximately 0.15 given a floating image viewing angle of approximately 10 degrees. The f-theta lens was focused about 8 mm above the surface of the card. A floating black-and-white image was produced upon laser engraving. In this case, a polycarbonate card containing a color floating image, a 2 dimensional personalized black-and-white portrait image, and a laser-personalized black-and-white floating signature image on a white background was produced.

What is claimed is:

1. A laser-personalizable security article comprising:
a multi-layer security document, the multi-layer security document comprising:
an optically transparent cover layer with a first surface, a second surface, and a thickness between the first surface and the second surface, the first surface being at least partially a microstructured surface, wherein the microstructured surface forms microlenses or a lenticular surface;
a composite image, wherein the composite image comprises a collection of complete or partial images located on or within the second surface of the cover layer such that when viewed through the microstructured surface of the cover layer, the collection of complete or partial images forms the composite image;
an imagable layer located adjacent to the cover layer, wherein the imagable layer is a laser imagable layer comprising a radiation sensitive material layer;
wherein there are no adhesive layers between the cover layer and the image layer; and a layer adjacent to the imagable layer.

2. The laser-personalizable security article of claim 1, wherein the microstructured surface comprises microlenses, and the cover layer thickness is such that the second surface of the cover layer is within the focal plane of the microlenses.

3. The laser-personalizable security article of claim 1, wherein the collection of complete or partial images is printed or laser written.

4. The laser-personalizable security article of claim 1, wherein the composite image comprises a color image.

5. The laser-personalizable security article of claim 1, wherein the cover layer comprises a multi-layer construction comprising a cover film and a spacing film.

6. The laser-personalizable security article of claim 1, wherein the imagable layer comprises a laser charable layer, a laser writable multi-layer film article, or a combination thereof.

7. The laser-personalizable security article of claim 1, wherein the security document comprises additional layers.

8. The laser-personalizable security article of claim 1, wherein the imagable layer further comprises a two dimensional image.

9. The laser-personalizable security article of claim 1, wherein different portions of the microstructured surface form different microlenses.

10. The laser-personalizable security article of claim 1, wherein the microstructured surface comprises a crosslinked (meth)acrylate material.

11. A laser-personalized multi-layer security document comprising:
an optically transparent cover layer with a first surface, a second surface, and a thickness between the first surface and the second surface, the first surface being at least partially a microstructured surface, wherein the microstructured surface forms microlenses or a lenticular surface;
a first composite image, wherein the first composite image comprises a collection of complete or partial images located on or within the second surface of the cover layer such that when viewed through the microstructured surface of the cover layer, the collection of complete or partial images forms the first composite image;
an imaged layer, comprising an imagable layer that is a laser imagable layer comprising a radiation sensitive material layer that has been image, and is located adjacent to the cover layer, wherein the imaged layer comprises at least one personalized laser imaged second composite image comprising a collection of complete or partial images such that when viewed through the microstructured surface of the cover layer the collection of complete or partial images forms the second composite image; wherein there are no adhesive layers between the cover layer and the image layer; and
a layer adjacent to the image layer.

12. The laser-personalized multi-layer security document of claim 11, wherein the security document comprises additional layers.

13. A method of preparing a laser-personalizable security article comprising:
providing an optically transparent cover layer sheet with a first surface, a second surface, and a thickness between the first surface and the second surface, the first surface being at least partially a microstructured surface, wherein the microstructured surface forms microlenses or a lenticular surface;

providing a composite image, wherein the composite image comprises a collection of complete or partial images located on the second surface of the cover layer such that when viewed through the microstructured surface of the cover layer, the collection of complete or partial images forms the composite image;

providing an imagable layer sheet, wherein the imagable layer is a laser imagable layer comprising a radiation sensitive material layer;

providing at least one additional layer;

forming a laminate by laminating the second surface of the cover layer sheet to the imagable layer sheet, and the additional layer to the imagable layer sheet; and wherein there are no adhesive layers between the cover layer and the image layer.

14. The method of claim 13, wherein the lamination comprises lamination with heat and pressure.

15. The method of claim 13, wherein the collection of complete or partial images is located on or within the second surface of the cover layer.

16. The method of claim 15, wherein the microstructured surface comprises microlenses, and the cover layer thickness is such that the second surface of the cover layer is within the focal plane of the microlenses.

17. The method of claim 15, wherein collection of complete or partial images is printed or laser written.

18. The method of claim 13, wherein the composite image comprises a color image.

19. The method of claim 13, wherein the imagable layer comprises a laser charable layer, a laser writable multi-layer film article, or a combination thereof.

20. The method of claim 13, wherein the microstructured surface comprises a crosslinked (meth)acrylate material.

* * * * *